May 12, 1953  J. K. NORTHROP ET AL  2,638,291
ALL-WING CARGO PACK
Filed July 17, 1950  5 Sheets-Sheet 1
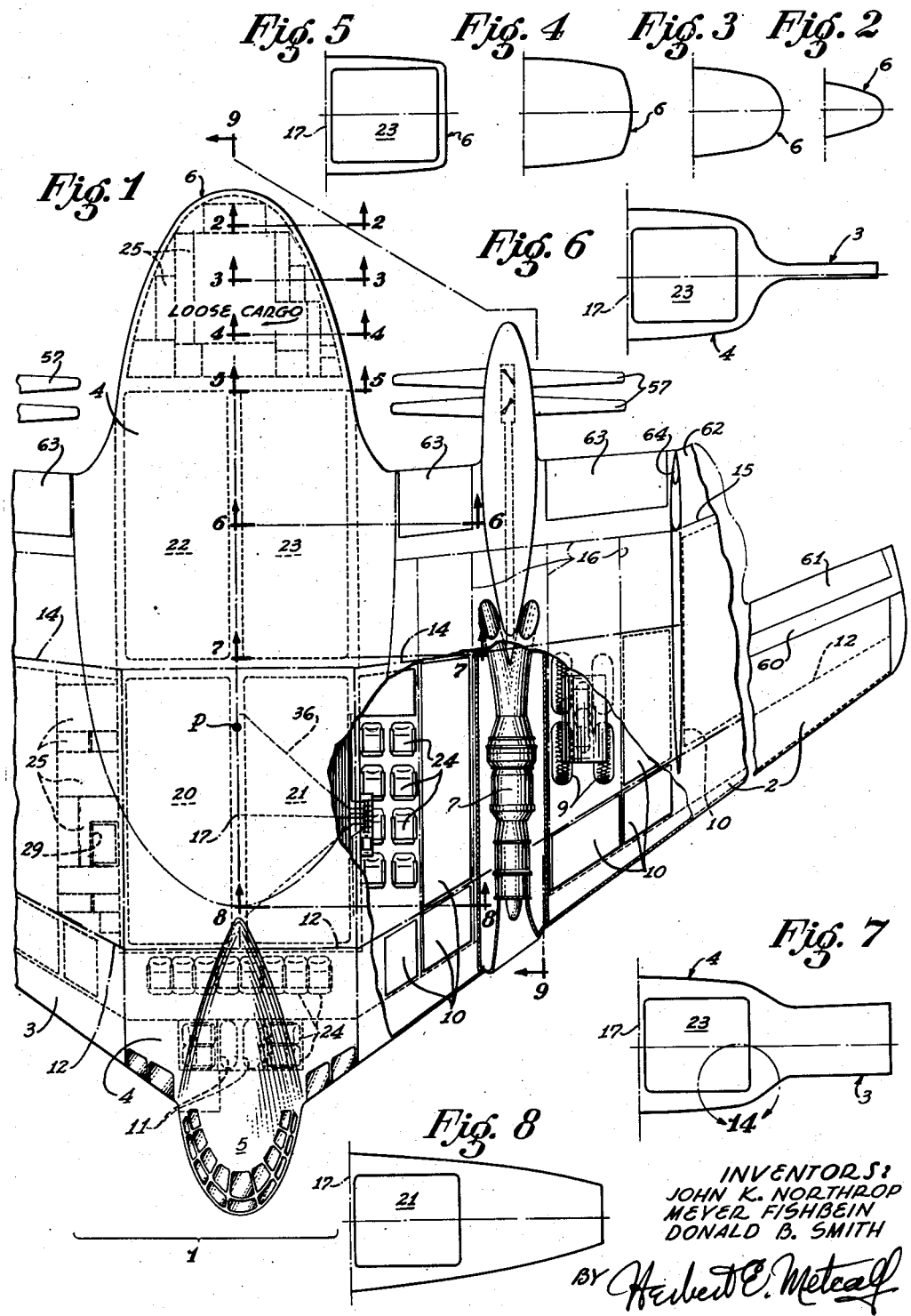
INVENTORS:
JOHN K. NORTHROP
MEYER FISHBEIN
DONALD B. SMITH
BY Herbert E. Metcalf
THEIR PATENT ATTORNEY May 12, 1953  J. K. NORTHROP ET AL  2,638,291
ALL-WING CARGO PACK Filed July 17, 1950  5 Sheets-Sheet 2

INVENTORS:
JOHN K. NORTHROP
MEYER FISHBEIN
DONALD B. SMITH

BY Herbert E. Metcalf
THEIR PATENT ATTORNEY

May 12, 1953 J. K. NORTHROP ET AL 2,638,291
ALL-WING CARGO PACK
Filed July 17, 1950 5 Sheets-Sheet 4

INVENTORS:
JOHN K. NORTHROP
MEYER FISHBEIN
DONALD B. SMITH
BY Herbert E. Metcalf
THEIR PATENT ATTORNEY May 12, 1953 J. K. NORTHROP ET AL 2,638,291
ALL-WING CARGO PACK
Filed July 17, 1950 5 Sheets-Sheet 5

INVENTORS:
JOHN K. NORTHROP
MEYER FISHBEIN
DONALD B. SMITH
By Herbert E. Metcalf
THEIR PATENT ATTORNEY Patented May 12, 1953

2,638,291

UNITED STATES PATENT OFFICE 2,638,291

ALL-WING CARGO PACK

John K. Northrop, Hawthorne, Meyer Fishbein, West Los Angeles, and Donald B. Smith, North Hollywood, Calif., assignors to Northrop Aircraft, Inc., Hawthorne, Calif., a corporation of California Application July 17, 1950, Serial No. 174,204

3 Claims. (Cl. 244—118)

This invention relates to airplanes, and, more particularly, to a tailless airplane specifically designed for the transportation of cargo, the cargo preferably being in packets of a standard size.

In tailless or all-wing airplanes of relatively large size, such as ones embodying the principles set forth in U. S. Patent No. 2,406,506 to J. K. Northrop, a central space is obtainable between the wing panels for crew and load distribution as desired.

It is an object of the present invention to provide an all-wing airplane having the required space and provisions in this central section for efficiently handling cargo in the form of loaded packages of various densities.

In conventional present-day cargo airplanes, loading is accomplished either through a fuselage side door or end doors and ramps, thus requiring special handling equipment between the transporting vehicle and the final carrying position in the airplane. Another object of this invention is to provide an all-wing cargo aircraft in which the pre-packed cargo is loaded from truck to final cargo hold position in only one straight-line operation.

It is still another object of the present invention to provide an all-wing cargo airplane having a geometry which permits carrying cargo packages and other useful loads in various combinations of weight and position without adversely affecting the airplane balance. Other objects and features of advantage will be noted in the description of a specific embodiment forming the main part of this specification.

Briefly, our invention comprises a modified plan-form all-wing airplane having swept-back wing panels and a center section extending forward and aft from the wing root chord, this center section having large, individual cargo holds provided at the bottom with access doors which uncover entirely each cargo hold. The airplane is so designed that any standard truck and trailer can be driven straight under a cargo hold and a loaded cargo package lifted directly into the airplane. Airplane-mounted hoisting and tie down equipment is provided which makes it possible to perform four such loading operations in a matter of minutes. A substantial additional volume is provided for loose cargo or passengers.

This invention may be more fully understood by reference to the accompanying drawings, shown by way of illustration and not limitation, wherein:

Figure 1 is a partial cut-away plan view of one airplane embodying the present invention, showing the interior arrangement.

Figures 2 through 8 are cross sectional views of the center section outline and part of the adjacent wing on one side of the airplane center line, taken as indicated by the lines numbered 2—2 through 8—8, respectively, in Figure 1.

Figure 9:
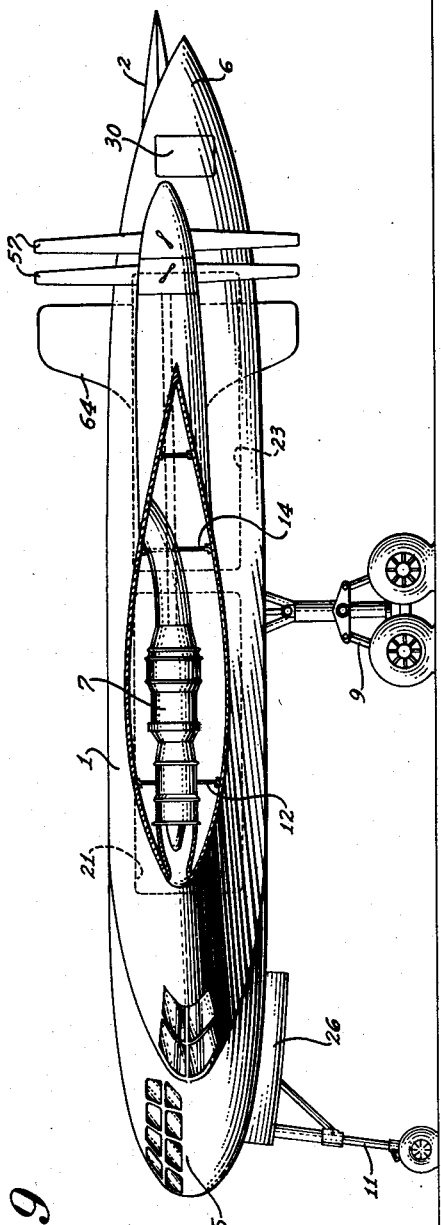
Figure 9 is a side view looking toward the center of the airplane from the outboard side of the left-hand engine, as indicated by line 9—9 in Figure 1.

Referring first to Figure 1 for a detailed description of a preferred embodiment of this invention, an all-wing airplane 1 having sweptback outer wing panels 2 and stub wing sections 3 is provided with an elongated center section 4. In the forward center section portion is provided a crew compartment 5 projecting forward of the wing leading edge, but not necessarily projecting higher than the normal wing section at the airplane center line. At the rear of the center section 4, a tail cone 6 extends aft from the wing trailing edge and is substantially wider than the crew compartment 5, but about the same height.

The stub wing sections 3 have a thicker and deeper dimension at the airplane center line than a straight inward extension of the outer wing panels would provide. This gives a sufficient cargo space height so that ample room is available for the maximum load which the airplane is capable of carrying. Operational equipment, such as engines 7, main landing gear 9, fuel tanks 10, and the like, are housed in the stub wing sections 3, while a nose landing gear 11 is mounted under the crew compartment 5.

The main load-bearing structure of the airplane comprises a front spar 12 and a rear spar 14 extending laterally across the center section 4 and through the stub wing sections 3. The front spar 12 continues out to the wing tips. The rear spar 14 ends between the stub wing sections 3 and the outer wing panels 2, and loads from an outer wing spar 15 are transferred to the rear spar 14 by longitudinal and lateral bulkhead members 16. A central truss 17 on the longitudinal center line of the airplane is also provided, this truss forming the primary load-bearing member, and upon which the nose gear 11 acts. The central truss 17 does not extend all the way through the tail cone 6.

Figure 10:
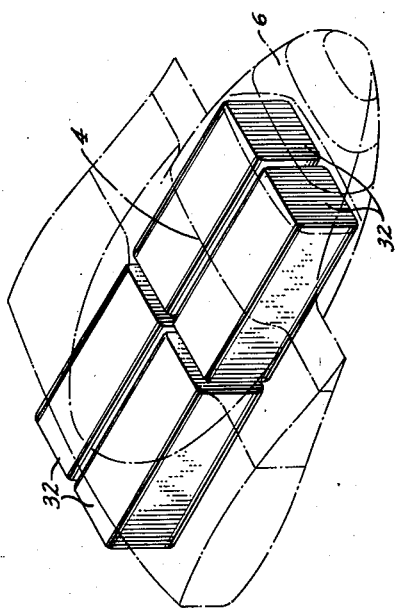
Figure 10 is a phantom perspective view of the rear of the center section, showing the arrangement of four cargo packs therein.

Between the front and rear spars 12 and 14 are located two large cargo holds 20 and 21, one on each immediate side of the central truss 17. Similarly, two more cargo holds 22 and 23 are located just aft of the rear spar 14. These cargo holds occupy the majority of center section volume, and each are designed to hold an 8 by 8 by 20 foot cargo package within the center section 4. The center section, therefore, extends above and below the wing outline aft of the maximum wing thickness, as shown in Figures 2 through 8. The rear two cargo holds 22 and 23 extend partially into the tail cone 6, as further shown in Figure 10.

Useful space for additional cargo or several passengers is also available on all four sides of the main cargo space. As indicated in Figure 1, seats 24 for a total of 28 passengers may be provided in the left and right stub wing sections 3 and in the center section 4 forward of the cargo holds 20 and 21, or these spaces may be designed for carrying loose cargo 25, including approximately 900 cubic feet in the tail cone 6. Normal crew and passenger entrance is in the nose wheel bay through a nose gear door 26, as shown in Figure 9. For loading access to the loose cargo 25, a cargo hold door 27 (Figure 13) may be provided in the outboard wall of each of the four main holds, although a bottom door 29 (Figure 1) is preferably employed for the stub wing sections 3. In the tail cone 6, a side door 30 is used (Figure 9). These are in addition to the nose gear door 26, which is used in either the passenger or all-cargo configuration.

Figure 11:
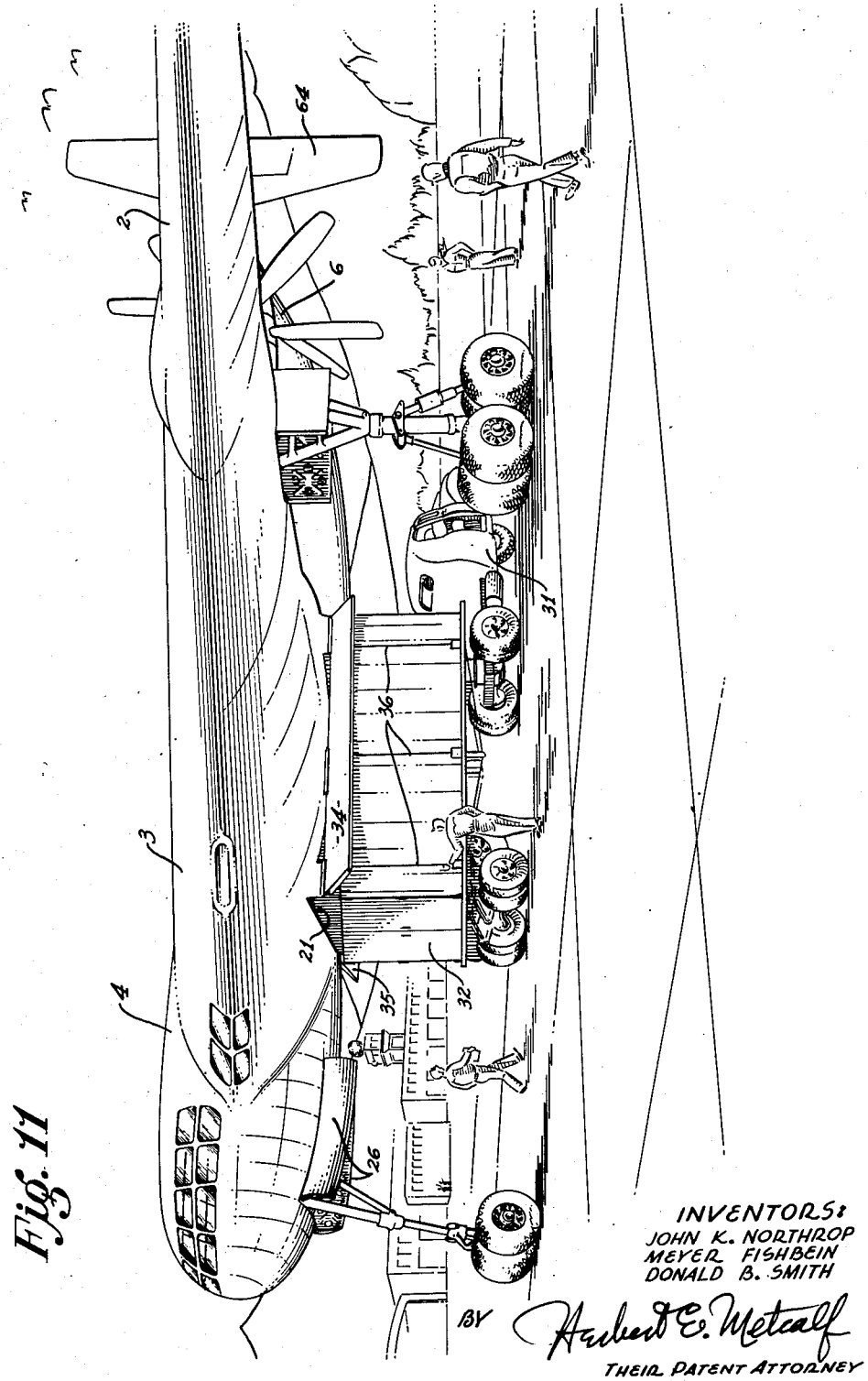
Figure 11 is a perspective view of the airplane of Figure 1 on the ground, showing a trailer with cargo pack in loading position under one of the forward cargo holds.

Clearance between the bottom of the airplane and the ground is approximately 12 feet, thus enabling any standard truck and trailer 31 (Figure 11) with a cargo pack 32 to be driven under any of the cargo holds, after two hinged panels 34 and 35 covering the hold have been opened. The cargo pack 32 is then hoisted straight into its hold by means of cables 36 operated by built-in hoisting equipment in the airplane, and the hinged panels 34 and 35 are closed to restore the smooth wing contour.

Figure 13:
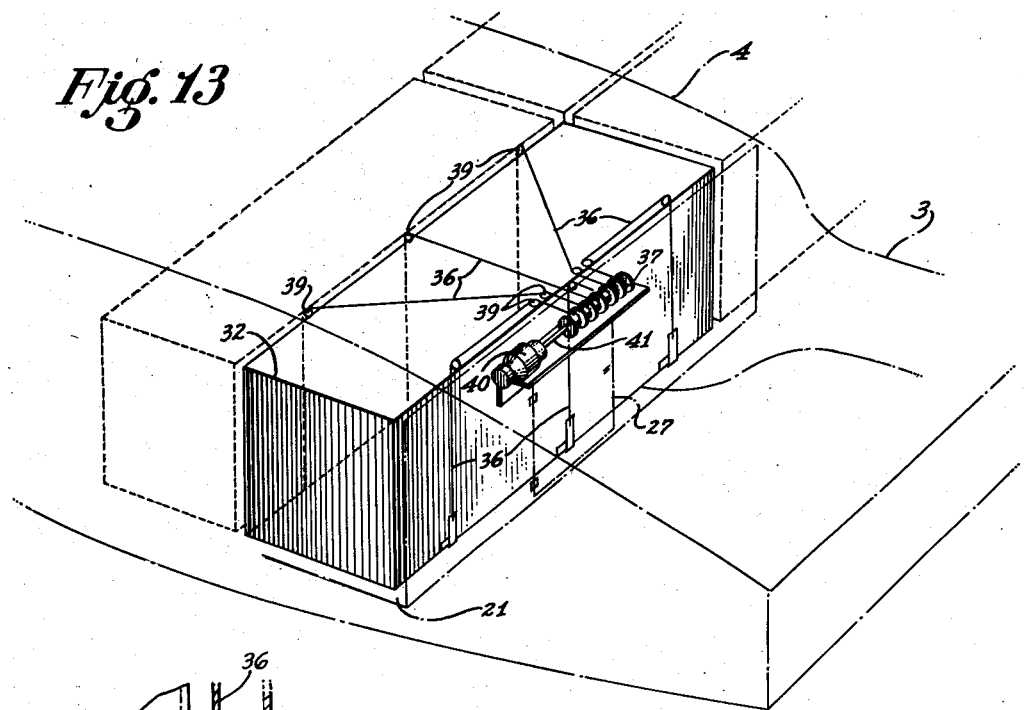
Figure 13 is a perspective view of a typical hoisting arrangement for one cargo pack, showing the cargo in loaded position in the airplane.

A typical hoisting arrangement is shown in Figure 13. Here, a longitudinal drum assembly 37 is mounted near the top of the stub wing section just outboard of the center section 4. Six cables 36 are fastened to individual sections of this drum assembly 37, and the cables 36 lead over pulleys 39 located in the space just above the cargo hold 21 to descend vertically to attachment points near the bottom of the cargo pack 32. An electric motor and brake unit 40 is connected to a drum shaft 41 to operate the drum 37 and raise or lower all six cables 36 simultaneously. A seperate hoist assembly is provided for each of the four holds, and operating power is supplied through the airplane's electrical system, either directly or by means of an external power receptacle.

Figure 14:
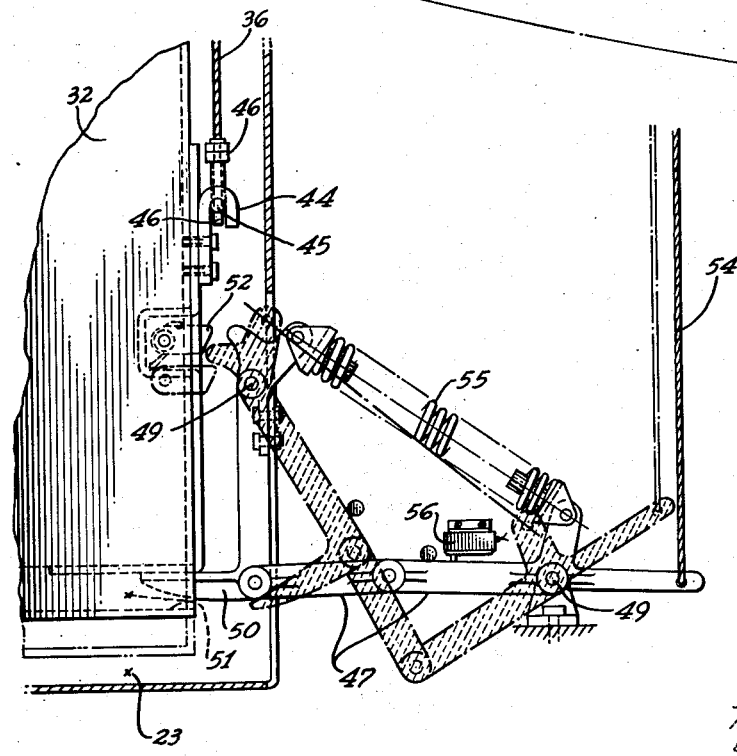
Figure 14 is an enlarged fragmentary view, partly sectional, taken where indicated by the circular line 14 in Figure 7, showing one of the locking means for locking the cargo packs in place.

At the six attachment points on the cargo pack 32 (Figure 14), a slotted hanger 44 is provided to receive a T-shaped cable terminal 45 which may be adjusted relative to the cable by threaded fittings 46 between the cable and terminal. Also shown in Figure 14 is one means of locking the cargo pack 32 in position in the hold. This comprises a toggle linkage 47, mounted on pivot points 49 fixed to the wing structure, and carrying a support member 50 which is adapted to engage with a recess 51 in the cargo pack 32 when the toggle is tripped by a lug 52 mounted to travel with the cargo pack 32. The locked position of the linkage is shown in solid lines, and the unlocked position is lightly shaded for clarity of the illustration. The cable hanger 44 is offset longitudinally from the linkage 47 and lug 52. The linkage is unlocked by a release cable 54 when the cargo is to be lowered. A stiff compression spring 55 acts to hold the linkage in either the locked and unlocked positions, with three linkage points located just beyond dead center in both positions.

As the cargo pack trips the lock and continues upwardly a short distance, the support member 50 enters the recess 51 and a limit switch 56, also fixed in the wing structure, is opened as the linkage snaps into final locked position. This limit switch 56 is connected in the hoisting motor circuit (not shown) so that the upward motion is automatically halted when the cargo pack is up and locked. The threaded cable fittings 46 are previously adjusted for proper cable length to lock all support members substantially simultaneously.

In the particular airplane shown herein, the two engines 7 are of the gas turbine type, each delivering 12,000 shaft horsepower to drive pusher propellers 57, although more engines of less power can be employed instead. With a wing span of 172 feet, the empty weight of the airplane is 101,349 pounds, and the maximum gross weight is 206,000 pounds. In the all-cargo version, the total cargo volume is 6,340 cubic feet, of which 3,600 cubic feet is the net cargo hold volume. With an average cargo density of about 10 pounds per cubic foot for a full load, a trip length of 1500 statute miles is possible, at a direct operating cost of less than three and one-half cents per ton-mile. Cargo densities on the order of 20 pounds per cubic foot can be handled for shorter trips. These figures give one example of what can be accomplished with the general design of the present invention.

The center of gravity of the airplane 1 generally lies approximately at point P, as shown in Figure 1. The four cargo holds are grouped so closely around this point that any one of the four cargo packs may be completely omitted without shifting the center of gravity longitudinally beyond its maximum limits.

By providing an airplane specially designed to accommodate loaded cargo packs of the type described, combination truck-rail-airplane methods of cargo movement are made more efficient, and with a minimum of ground handling, thus resulting in high aircraft utilization and low costs.

Figure 12:
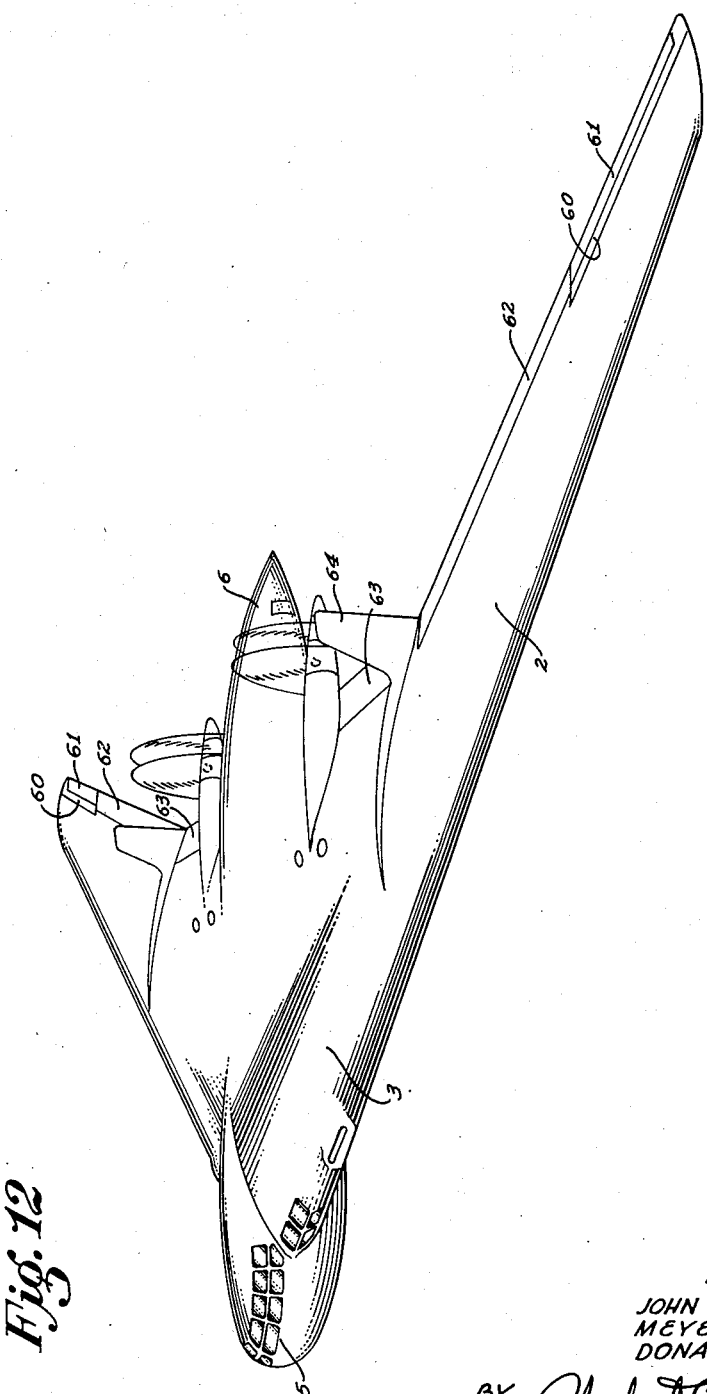
Figure 12 is a flight perspective view of the same airplane.

The flight controls of the airplane above described are similar to those used on the large all-wing airplane of the patent referred to and comprise, as shown in Figures 1 and 12, a pair of wing tip trim flaps 60 having separable portions 61 to create unilateral drag for directional control, large elevons 62, one on each outer wing panel 2, and landing flaps 63 on either side of the propeller fairings. Fixed vertical fins 64 may be provided to improve the directional stability. The cruising speed of the airplanes built in accordance with the present invention will, of course, vary with installed engine power, but will be in the neighborhood of 400 M. P. H. or above.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A tailless all-wing cargo airplane comprising swept-back wings, a center section extending aft from the trailing edge of said wings at the fore-and-aft center line of said airplane, said center section merging smoothly into the adjacent wing structure and having a height equal to the maximum wing thickness at said center line, a main structural bulkhead assembly in the vertical plane at said center line from which said wings are supported, front and rear wing spars crossing said center section laterally at right angles to said bulkhead assembly, and structurally connected to said bulkhead along vertical lines, said bulkhead and said spars defining a plurality of rectangular adjacent cargo holds in said center section, said cargo holds being located to the rear of each of said spars, on both sides of said bulkhead, and extending vertically for a majority of said center section height, and access doors mounted in the bottom of said center section to expose substantially the complete volume of all said cargo holds when said doors are open.

2. In a tailless all-wing cargo airplane having swept-back wings, the structural combination comprising a center section extending aft from the trailing edge of said wings at the fore-and-aft center line of said airplane, said center section merging smoothly into the adjacent wing structure and having a height equal to the maximum wing thickness at said center line, a main structural bulkhead assembly in the vertical plane at said center line from which said wings are supported, front and rear wing spars crossing said center section laterally at right angles to said bulkhead assembly, and structurally connected to said bulkhead along vertical lines, said bulkhead and said spars defining a plurality of rectangular adjacent cargo holds in said center section, said cargo holds being located to the rear of each of said spars, on both sides of said bulkhead, and extending vertically for a majority of said center section height, and access doors mounted in the bottom of said center section to expose substantially the complete volume of all said cargo holds when said doors are open.

3. Apparatus in accordance with claim 1 wherein each of said cargo holds is proportioned to contain one cargo pack of such size as to fit a standard truck trailer bed, said airplane having landing gear assemblies arranged to hold said airplane at a sufficient height from the ground to enable a truck loaded with said cargo pack to drive beneath any of said cargo holds.

JOHN K. NORTHROP.
MEYER FISHBEIN.
DONALD B. SMITH.

References Cited in the file of this patent

UNITED STATES PATENTS

| Number | Name | Date |
| --- | --- | --- |
| 2,077,910 | Thomson | Apr. 20, 1937 |
| 2,224,641 | Burnelli | Dec. 10, 1940 |
| 2,367,538 | Sullivan | Jan. 16, 1945 |
| 2,380,290 | Burnelli | July 10, 1945 |
| 2,406,506 | Northrop | Aug. 27, 1946 |
| 2,415,975 | Thomson | Feb. 18, 1947 |
| 2,463,346 | Akerman | Mar. 1, 1949 |
| 2,514,045 | Gardenhire | July 4, 1950 |